May 19, 1970  O. GEORG  3,512,476
SCREW PRESS WITH TWO OR MORE SCREWS
Filed Sept. 13, 1967  4 Sheets-Sheet 1
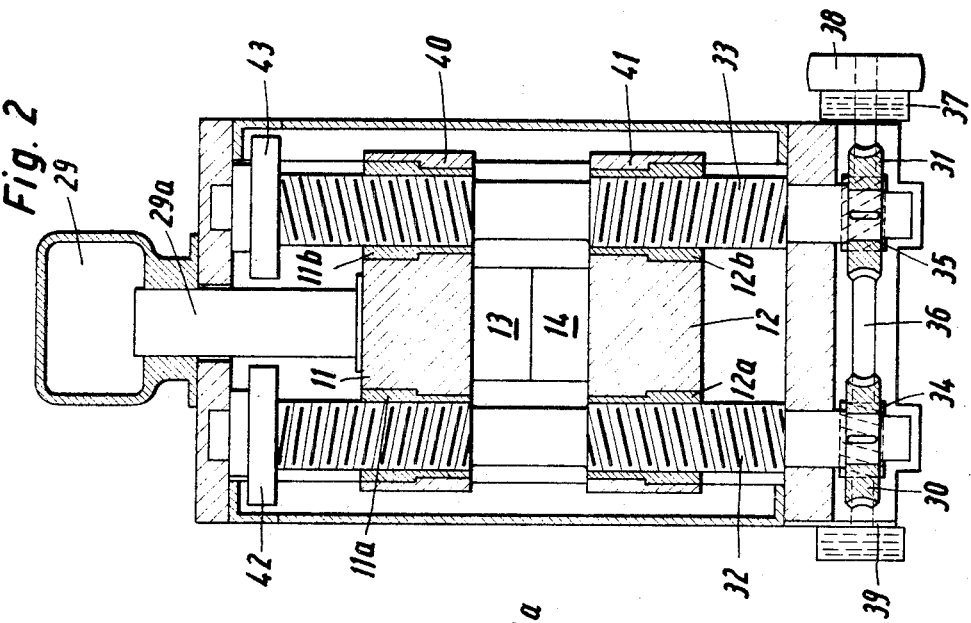
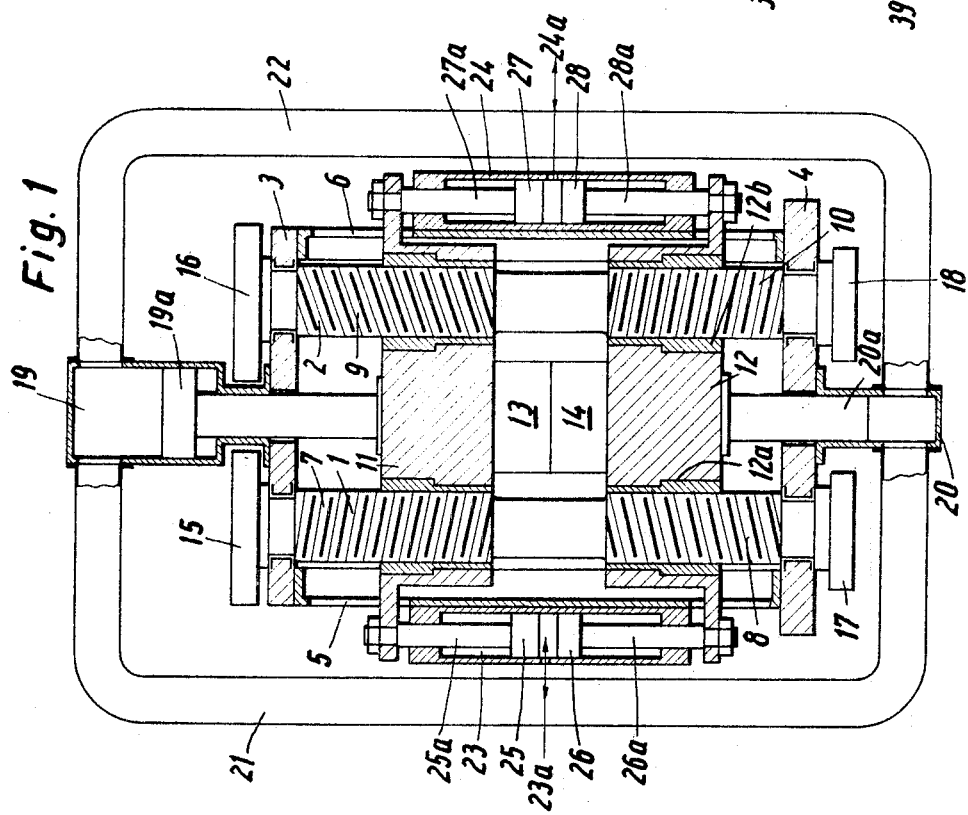
Inventor:
Otto Georg

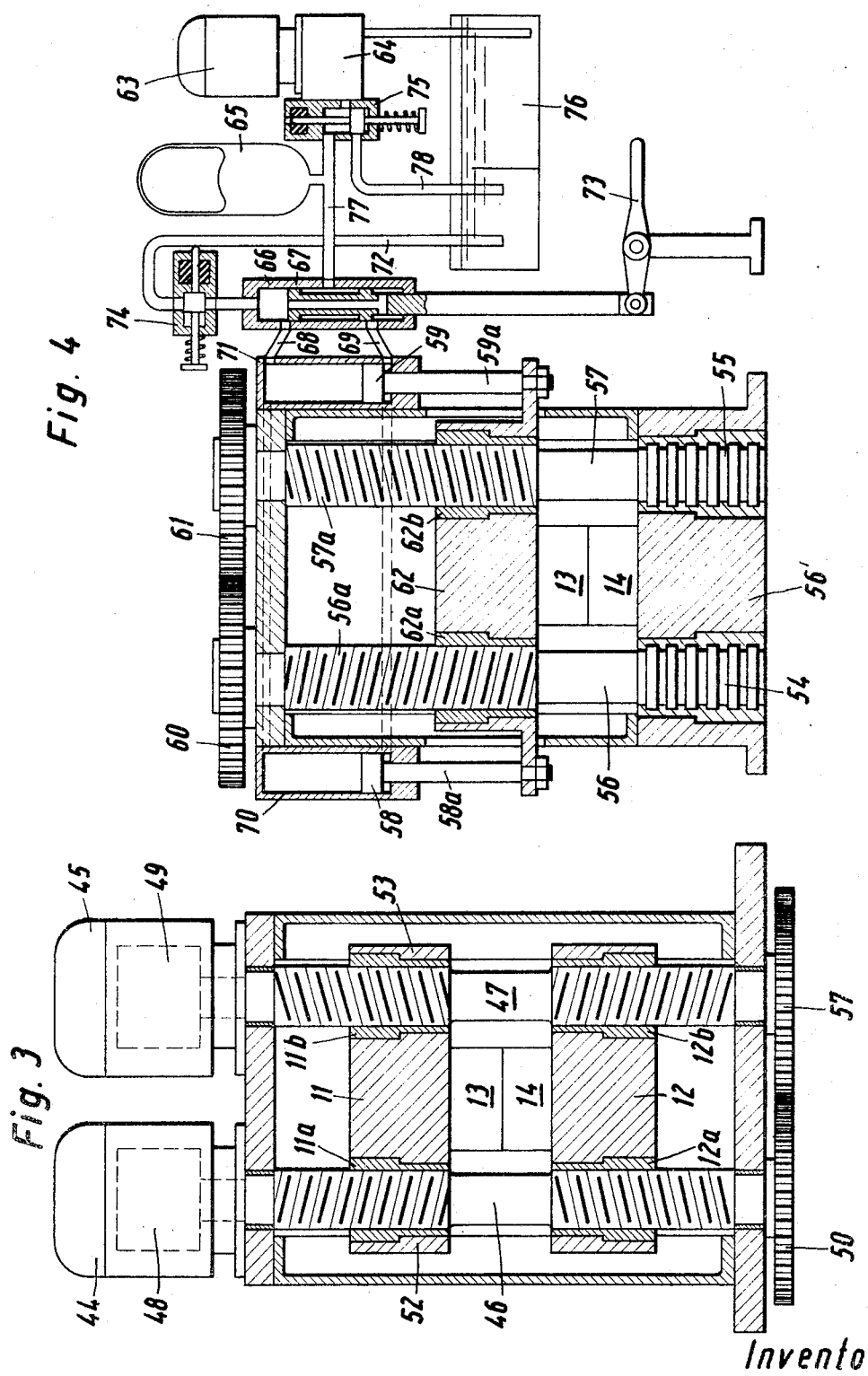

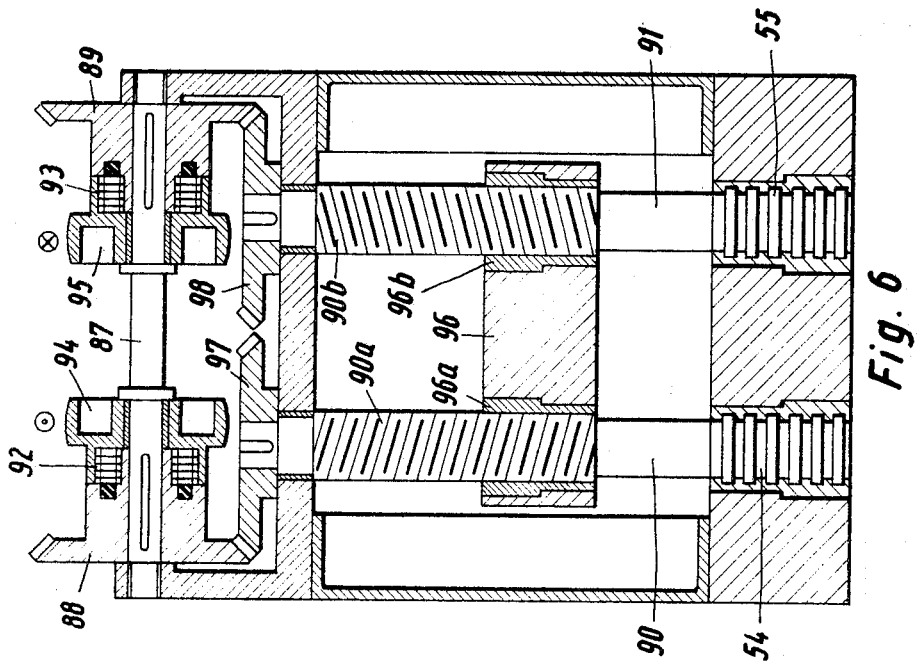
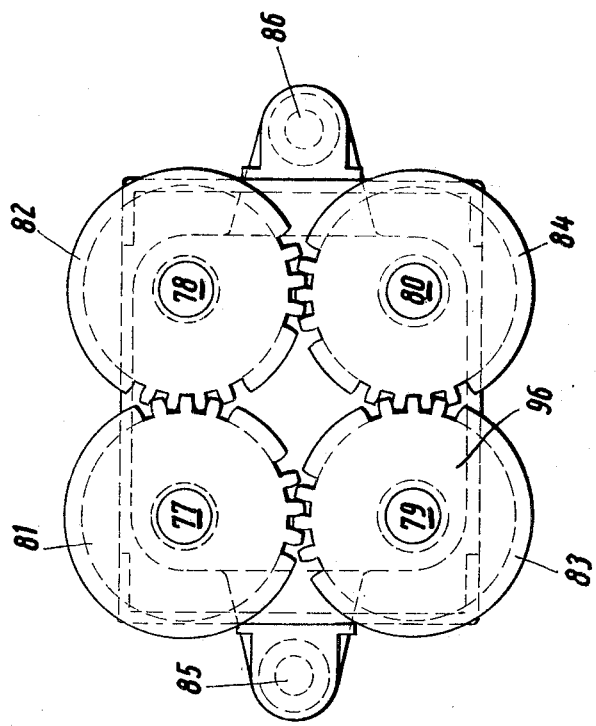

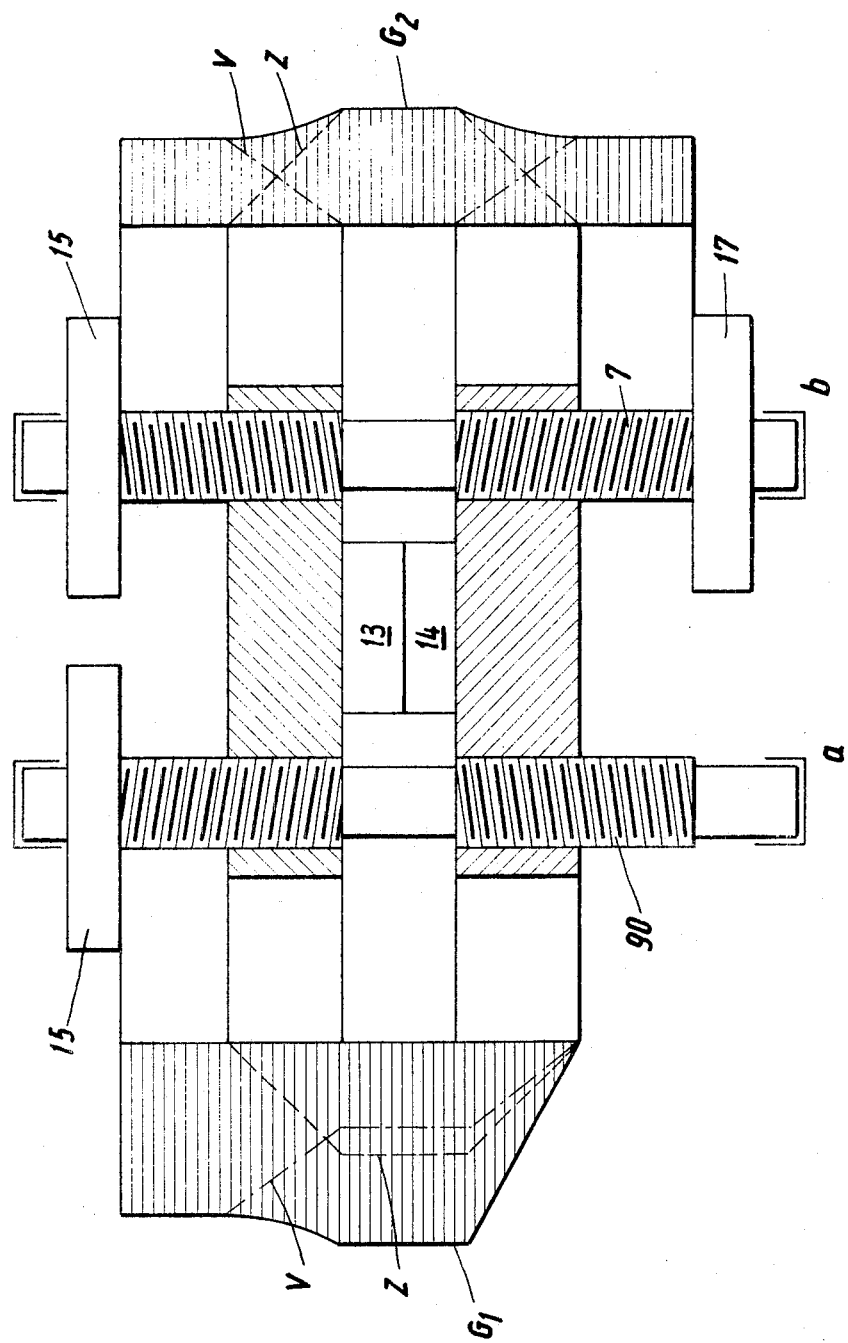

United States Patent Office 3,512,476
Patented May 19, 1970

---

3,512,476
SCREW PRESS WITH TWO OR MORE SCREWS
Otto Georg, 12 Oststrasse, 5805 Breckerfeld, Germany
Filed Sept. 13, 1967, Ser. No. 667,602
Int. Cl. B30b *1/08*
U.S. Cl. 100—270                 14 Claims

ABSTRACT OF THE DISCLOSURE

A screw press in which an upper press carriage and a lower press carriage can be brought together with a workpiece between them by rotating at least two screws which are engaged in both press carriages. The screws are provided with flywheels so that as the press carriages are brought together, energy is imparted to the flywheels and this energy is converted to a high pressure when both press carriages come into contact with the work-piece and the press carriages are brought to rest in a very short distance. In general, the screws each engage the two press carriages with threaded portions of opposite hand; there are two flywheels on each screw arranged adjacent a respective screw thread; the inertia of the flywheels is made proportional to the pitch of the adjacent screw thread. In one particular embodiment, the pitch of one screw thread is 0 so that the screw is rotatable in but axially held in relation to one of the press carriages; in this particular case, the inertia of the flywheel associated with the thread of 0 pitch is also 0, that is the flywheel is omitted: thus the screws of this press have only one threaded portion and only one flywheel adjacent the threaded portion.

BACKGROUND OF THE INVENTION

Some screw presses have two or more screws to which flywheels are fixed which during the greater part of the working stroke of the press are accelerated and thus have kinetic energy imparted to them. When two press carriages driven by the screws engage a work-piece, the kinetic energy is converted to a high pressure within a very short distance.

These screw presses have a flywheel the moment of inertia of which can be varied by means of movable masses arranged in the manner of flyweights. These presses have however not proved successful since the mounting of the movable masses does not withstand the high stresses which arise during hard press impact.

In the case of multi-screw presses it is of particular importance that the screws, which have to be manufactured from very expensive material, should be of the minimum possible dimensions. On striking it is however necessary that to produce the high working pressure a high torque is provided by the flywheels fixed to the screws. The working pressure results from the retardation of the rapidly running flywheels within an interval of time amounting to only fractions of a second. However the cross-section of the screws is subjected to extremely high tensile stresses on retardation of the flywheels. At the same time the tensile-stressed part of the screw has to counterbalance the high torque so that the screws have to be made of extremely large size to avoid fractures. The possible advantage which multi-screw presses offer as a result of not requiring a heavy press frame has hitherto been lost through the need to use very heavy screws.

An object of the invention is to provide a screw press in which the stresses imparted to the screws of the press are reduced to a minimum.

SUMMARY

A screw press has two or more screws each with two threaded portions of mutually opposite hand. The screws are rotatable to allow an upper press carriage and a lower press carriage to be brought together with a workpiece between them. Each screw threadingly engages the upper carriage with one threaded portion and the lower press carriage with the other threaded portion. Each screw carries two flywheels, one adjacent the threaded portion of the press carriage. The effective inertia of each flywheel is proportional to the pitch of the adjacent threaded portion.

DESCRIPTION

Embodiments of the invention will now be described with reference to the accompanying drawings in which:

FIG. 1 shows a twin screw press in vertical section, in which the motion of the carriage during the working stroke takes place by means of a pre-compressed gaseous pressure medium and the return stroke takes place by introducing a hydraulic liquid into return stroke cylinders;

FIG. 2 shows a modification to FIG. 1, in which the return stroke is achieved by means of a screw drive;

FIG. 3 shows a twin screw press in which the drive is modified relative to FIGS. 1 and 2 by providing a reversible electric motor for each screw;

FIG. 4 shows an embodiment of a twin screw press with only one movable carriage which is moved by means of reversible pressure medium cylinders;

FIG. 5 shows a plan view of a four-screw press which is driven by pressure medium cylinders;

FIG. 6 shows a further embodiment of a multi-screw press with only one movable carriage; and FIG. 7 is a diagrammatic representation of the stresses arising at the end of the working stroke in a screw having only one flywheel and in a screw with two flywheels.

The press represented in FIG. 1 shows two parallel screws 1 and 2 which at their upper ends are carried in an upper crossbar 3 and at their lower ends are carried in a lower crossbar 4. The crossbars 3 and 4 are held together by weak vertical supports 5 and 6. The screws 1 and 2 are each provided with two threads 7, 8, and 9, 10 respectively, which in each case are of opposite thread direction and different pitch. The threads on the screws engage and pass through bronze nuts 11a, 11b and 12a, 12b respectively which are fixed to the two press carriages 11 and 12. The carriages 11 and 12 are provided with tools 13 and 14 which serve to shape the articles being worked. The screw 1 is provided at its two ends with rigid flywheels 15 and 17 and the screw 2 is provided with corresponding flywheels 16 and 18. The top flywheels 15 and 16 are, because of the greater pitch of the threads 7 and 9, heavier than the flywheels 17 and 18 which are fixed to the ends of the screws having the threads of lower pitch 8 and 10.

The carriages 11 and 12 are driven by means of pre-compressed gas in cylinders 19 and 20 provided at the top and bottom, in which pistons 19a and 20a are guided. The piston 19a guided in the upper cylinder 19 is coupled to the upper press carriage 11. Correspondingly, the piston 20a guided in the lower cylinder 20 is fixed to the lower press carriage 12. In order to increase the accumulator volume and to equalise the pressure, the cylinders 19 and 20 are connected together by means of thick-walled tubes 21 and 22. The pressure gas in the cylinders 19 and 20 is compressed, on the return stroke, by means of hydraulic liquid which is introduced at 23a and 24a between, in each case, two pistons 25 and 26, and 27 and 28 respectively, guided in cylinders 23 and 24. The piston rods 25a, 26a, 27a and 28a extending from the pistons 25, 26, 27 and 28 are coupled to the carriages 11 and 12.

The mode of action of the press according to FIG. 1 is as follows: Firstly the carriage 11 is moved to its upper limiting position and the carriage 12 to its lower limiting position. This takes place by introducing hydraulic liquid at 23a and 24a between the pistons 25, 26 and 27, 28 in the cylinders 23 and 24. During this upward and downward movement of carriages 11 and 12 respectively the pressure in the gas-filled cylinders 19 and 20 increases. The article being worked is now brought between the tools 13 and 14. If the hydraulic fluid is now run out of the cylinders 23 and 24, the potential energy of the pre-compressed gas in cylinders 19 and 20 is released. The gas expands and forces the carriages 11 and 12 against one another, whereupon the screws 1 and 2 and the flywheels 15, 16 and 17, 18 mounted on them are caused to rotate in an accelerating manner. When the tools 13 and 14 strike one another or strike the article being worked which is disposed between them, the movement of the carriages, screws and flywheels is suddenly retarded, with the generation of a high press pressure. The recoil thereby produced is elastically counteracted by the pressure medium in cylinders 23 and 24. The pistons 25, 26 and 27 and 28 are now again subjected to pressure medium and the carriages return to the starting positions.

FIG. 2 represents a twin screw press in which the drive of the carriages 11 and 12 in the direction of the working stroke is again brought about by means of pre-compressed gas in a cylinder 29. The press is, as shown, provided with only one cylinder 29. The motion of the carriages 11 and 12 to their upper and lower starting positions respectively takes place by means of a screw drive which is provided at the lower ends of the screws. The screw drive consists of worm wheels 30 and 31 which are each firmly splined onto spindles 32 and 33, and furthermore of two screws 34 and 35 with screw threads of opposite hands, provided on a drive shaft 36. The worm wheels 30 and 31 provide a flywheel effect which is supplemented by the rotatable shaft 36. The shaft 36 is provided with a clutch 37 by means of which it can be coupled to a drive pulley 38. A multiple-brake 39 is provided at the opposite end of the shaft 36 and serves to fix the carriages in their starting positions.

In operation the press according to FIG. 2, the carriages 40 and 41 are moved to their upper and lower end positions by means of the screw drive and are prevented from closing together by the brake 39. The article to be shaped is now introduced. As soon as the brake 39 is released the pre-compressed gaseous pressure medium in cylinder 29 can expand. Thereupon the piston 29a guided in cylinder 29 pushes the upper carriage 11 downwards. As a result of the engagement of the nuts 11a and 11b with the threads in the upper parts of the screws 32 and 33 the spindles are caused to rotate. As a result, the lower carriage 12, which is guided on the lower part of the screws 32 and 33, which are provided with threads of opposite hand, moves upwards. At the same time the flywheels 42 and 43, the worm wheels 30, 31, the screws 34 and 35 and the screw shaft 36 are accelerated. The tools 13 and 14 strike one another and shape the article being worked and thereafter the carriages 11 and 12 are again moved to their starting positions by the screw drive, and the gaseous pressure medium in cylinder 29 is at the same time compressed.

The threads provided in the upper and lower sections of screws 32 and 33 both have the same pitch in the embodiment shown. For this reason the inertia of the flywheels 42 and 43 is made equal to the inertia of the screw drive consisting of the worm wheels 30 and 31 and the shaft 36.

The drive of the two-screw press represented in FIG. 3 consists of two electric motors 44 and 45 which can be driven in either direction of rotation. The rotors of the electric motors are directly coupled to screws 46 and 47. Since this is a rotary drive, the pitch of the threads of the screws, which in the depicted embodiment are identical in the upper and lower parts, can be smaller than in the case of the axial drives shown in FIGS. 1 and 2. The inertia rotors 48 and 49 in the electric motors 44 and 45 is equal to that of the flywheels 50 and 51 provided at the lower ends of the screws. The flywheels 50 and 51 are provided with external gear-teeth and engage with one another. This results in excellent parallel guiding of the carriages 52 and 53, which is particularly advantageous if the carriages are eccentrically stressed by the working impact. It is therefore possible to construct the tools 13 and 14 to have several adjacent dies.

FIG. 4 represents a twin-screw press in which the two screws 56 and 57 are, at their lower ends, constructed as thrust bearings at 54 and 55. This results in a particularly advantageous construction. The lower carriage 56' no longer moves up and down but is constructed as a stationary table. This is of particular advantage when arranging the machine in an automatic production line consisting of several machine tools arranged successively, since the table of the press shown in FIG. 4 is always at exactly the same height for introducting the article being worked. Furthermore no flywheels are required at the lower ends of the screws.

The screws 56 and 57 are provided with relatively coarse threads 56a and 57a over approximately their upper half. In this way the degree of effectiveness of the axial drive, which is formed by double-acting pistons 58 and 59 in cylinders 70 and 71, is increased because the degree of effectiveness increases with the pitch of the thread. Rigid flywheels 60 and 61 are fixed to the upper ends of the screws 50 and 57 and are provided with gear teeth on their external periphery. The gear teeth engage with one another in order to ensure exact parallel guiding of the carriage 62. This makes special guiding of the carriage on the machine frame superfluous.

The cylinders 70 and 71 are fed with a hydraulic liquid. The hydraulic liquid is supplied by a pump 64 to which a motor 63 is connected. 65 is an accumulator and 66 is a control valve. With the control slide 67 of the valve 66 in the position shown in FIG. 4, the channels 68 and 69 issuing from the valve are open to exhaust. The channels lead to the two opposite sides of the pistons 58 and 59 guided in the cylinders 70 and 71. If a hand lever 73 coupled to the control slide 67 is moved downwards, the slide 67 moves upwards and connects the supply of hydraulic medium to the upper side of the pistons 58 and 59. When the pistons 58 and 59 travel downwards the carriage 62 is also forced downwards, as a result of which the screws 56 and 57 are caused to rotate progressively more rapidly. Before the tools 13 and 14 strike one another the lever 73 is brought to the central position so that upon recoil of the carriage 62 both sides of the pistons in the cylinders 70 and 71 are free of load. The lever 73 is then tilted upwards so that the hydraulic medium acts on the underside of the pistons 58 and 59. The carriage 62 as a result moves upwards. Since the lower piston surfaces are, because of the piston rods 58a and 59a which form the coupling to the carriage 62, smaller than the upper piston surfaces, the return stroke takes place more slowly than the working stroke and the flywheels 60 and 61 are not accelerated as much as during the working stroke.

A magnetic valve 74 which is disposed in the hydraulic medium return lead 72 issuing from the control valve 66 serves to brake the upward-moving carriage 62. The magnetic valve 74 is closed by a contact which is actuated by the carriage 62 shortly before it reaches its upper end position. When the hand lever 73 is again operated the current supply to the magnetic valve 74 is interrupted so that the valve returns to the open position under spring pressure and the press can execute a new working stroke.

A further magnetic valve 75 is provided at the exit of the pump 64, and releases a return flow lead 78 to the collecting vessel 76 when the pressure in the accumulator vessel 65 reaches a predetermined level. The motor 63 and the pump 64 can therefore continue to run without overload. As soon as the pressure in the vessel 65 drops below the predetermined limiting value, the magnetic valve 75 again closes the return flow lead 78.

FIG. 5 represents a plan view of a screw press provided with four screws 77, 78, 79 and 80. The flywheels are provided with rings of gear teeth which engage with one another. The carriage indicated at 96 is thus provided with excellent parallel guiding. The press is, as in FIG. 4, driven by means of two pressure cylinders 85 and 86 provided at the side. The embodiment represented in FIG. 5 is particularly suitable for presses with a large table.

In the case of the press represented in FIG. 6 the spindles 90 and 91 are driven by magnetic clutches. For this purpose two bevel gears 88 and 89 are mounted on a drive shaft 87 and engage with bevel gears 97 and 98 provided on the screws 90 and 91. The bevel gears 88 and 89 may be coupled, by means of magnetic clutches 92 and 93, with freely rotating drive pulleys 94 and 95 which rotate in opposite directions. If for example the left-hand clutch 92 is engaged, the press carriage 96 moves downwards; if on the other hand the right-hand clutch 93 is actuated, the carriage lifts. The clutches are provided with devices which prevent simultaneous actuation of both clutches.

The invention permits presses to be constructed which require a minimum of material and which provide an exceptionally high working output. The various drives are interchangeable so that any of the various types of presses shown can be equipped with any of the drive devices described.

The left hand side of FIG. 7, designated $a$, diagrammatically represents the stresses in a press screw 90 which arise, on using only one flywheel 15, at the end of the working stroke. The course of the torsional stress is given by curve V. When the press strikes there is an additional tensional stress; the relevant curve is shown at Z. The total stress reaches the level shown by curve $G_1$.

The right hand side of FIG. 7, designated $b$, shows that when using two flywheels 15 and 17, one at each end of the screw 7, the torsional stress V is significantly less. The tensile stress occurring when the press strikes is also less so that accordingly the resulting total stress $G_2$ also assumes a significantly more favourable level. The screw 7 can at the same time, assuming equal striking performance of the presses, be made significantly smaller than the screw 90.

I claim:

1. A screw press, comprising a first carriage having a pair of parallel internally threaded portions, one of which includes left-handed threads and the other of which includes right-handed threads; a second carriage; a pair of screws each having an externally threaded portion meshing with one of said internally threaded portions so that the screws are set in rotary motion in response to movement of said first carriage toward or away from said second carriage; flywheel means connected to each of said screws; and journalling means for locating said screws in predetermined axial positions.

2. A screw press as defined in claim 1, wherein said first carriage further comprises two additional internally threaded portions, and further comprising two additional screws having external threads each meshing with one of said additional internally threaded portions.

3. A screw press as defined in claim 1, further comprising fluid-operated cylinder and piston means for moving said first carriage away from said second carriage.

4. A screw press as defined in claim 1, further comprising double-acting fluid-operated cylinder and piston means operative to move said first carriage toward and away from said second carriage.

5. A screw press as defined in claim 4, further comprising control means for operating said cylinder and piston means and including a source of pressurized fluid, control valve means interposed between said source and said cylinder and piston means, and having a portion movable between a plurality of positions in one of which said source is sealed from said cylinder and piston means, in another of which said valve means admits fluid to said cylinder and piston means to effect movement of said first carriage toward the second carriage and a further position in which said control valve means admits fluid to said cylinder and piston means to effect movement of said first carriage away from said second carriage.

6. A screw press as defined in claim 5, further comprising means for braking said first carriage during the last stage of movement to one of its end positions.

7. A screw press as defined in claim 5, further comprising safety valve means for maintaining the pressure of said fluid in said source below a predetermined value.

8. A screw press as defined in claim 1, wherein one of said carriages is an upper carriage and the other of said carriages is a lower carriage; and wherein said flywheel means comprises two flywheels provided on each of said screws in the region of the respective end portions thereof, the effective inertial forces of each flywheel being proportional to the pitch of the respective externally threaded portion.

9. A screw press as defined in claim 8, wherein said externally threaded portion of each screw comprises two threaded sections one of which has a right-hand thread and the other of which has a left-hand thread, the threads of each of said threaded sections having a different pitch and the effective inertial forces of said two flywheels of each of said screws being mutually different.

10. A screw press as defined in claim 8; and further comprising a pressure operated cylinder arrangement operative for urging said carriages together on the working stroke of said press.

11. A screw press as defined in claim 10, wherein said cylinder arrangement is charged with a precompressed gaseous pressure medium.

12. A screw press as defined in claim 11; said cylinder arrangement comprising a pair of cylinders operative for driving said carriages together, and a pressure equalization lead interconnecting said cylinders.

13. A screw press as defined in claim 8; and further comprising a plurality of reversible electric motors each connected to one end of respective ones of said screws for rotating the latter and effecting relative movement of said carriages on the working stroke and return stroke.

14. A screw press as defined in claim 13, said electric motors having respective rotors, and wherein said rotors constitute at least some of said flywheels.

References Cited

UNITED STATES PATENTS

| | | | |
|---|---|---|---|
| 1,819,704 | 8/1931 | Friz | 100—290 XR |
| 1,913,663 | 6/1933 | Ferris | 100—270 XR |
| 3,035,514 | 5/1962 | Harvanek | 100—289 XR |
| 3,208,372 | 9/1965 | Taylor | 100—290 XR |
| 3,422,658 | 1/1969 | Michelson | 100—269 XR |

BILLY J. WILHITE, Primary Examiner

U.S. Cl. X.R.

72—407, 453, 454; 100—264, 290